(12) United States Patent
Hyen

(10) Patent No.: US 7,406,010 B2
(45) Date of Patent: Jul. 29, 2008

(54) DATA RECORDING/REPRODUCING METHOD WITH ROBUST ERROR HANDLING CAPABILITY AND DATA RECORDING/REPRODUCING APPARATUS THEREOF

(75) Inventor: Sang-hoon Hyen, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 578 days.

(21) Appl. No.: 10/892,482

(22) Filed: Jul. 16, 2004

(65) Prior Publication Data
US 2005/0041551 A1 Feb. 24, 2005

(30) Foreign Application Priority Data
Jul. 16, 2003 (KR) .................. 10-2003-0048654

(51) Int. Cl.
G11B 27/36 (2006.01)
G11B 20/10 (2006.01)

(52) U.S. Cl. .............. 369/53.16; 369/53.35; 369/47.14; 369/59.25; 714/6

(58) Field of Classification Search .............. 369/53.16, 369/53.17, 53.35, 59.25, 47.14; 714/6
See application file for complete search history.

(56) References Cited

U.S. PATENT DOCUMENTS 4,796,098 A * 1/1989 Giddings ..................... 386/47
7,167,961 B2 * 1/2007 Yeo ............................ 711/162

FOREIGN PATENT DOCUMENTS

| EP | 0 512 643 A2 | 11/1992 |
|---|---|---|
| KR | 1996-7006168 | 11/1996 |
| KR | 1999-76751 | 10/1999 |
| KR | 2000-21178 | 4/2000 |
| KR | 2000-66892 | 11/2000 |
| KR | 2001-95387 | 11/2001 |
| KR | 2002-33754 | 5/2002 |
| KR | 2002-72089 | 9/2002 |

OTHER PUBLICATIONS

"For Information Technology—At Attachment With Packet Interface—5 (ATA/ATAPI-5)" American National Standard, XX, XX, vol. 340, 2000, pp. I-IX, 1, XP001199652, pp. 19-29, 213-223 and paragraph ANNEXF!.
European Search Report issued Oct. 6, 2004.

* cited by examiner

*Primary Examiner*—Thang V. Tran
(74) *Attorney, Agent, or Firm*—Staas & Halsey LLP

(57) ABSTRACT

A data recording/reproducing method with robust error handling capability and a data recording/reproducing apparatus therefore, are provided. The data recording method includes: dividing data to be recorded on a recording medium into blocks having a predetermined size; repeatedly recording each block at a predetermined number of times on the recording medium, and recording the predetermined block size and the predetermined number of block recordings on the recording medium. According to the data recording method, it is possible to recover damaged data using a predetermined different block instead of a defective block by dividing data into blocks having a predetermined size and repeatedly recording the blocks on a recording medium a predetermined number of times, so that the recorded data has a robust defect resistance.

67 Claims, 12 Drawing Sheets

FIG. 2A (PRIOR ART)

| SYNC (12) | HEADER (4) ||| | USER DATA (2048) | AUXILIARY DATA (288) ||||
|---|---|---|---|---|---|---|---|---|---|
| | BLOCK ADDRESS(3) ||| MODE 1 (1) | | ECC (4) | ZERO (8) | ECC (276) ||
| | MIN (1) | SEC (1) | FRAME (1) | | | | | P (172) | Q (104) |

FIG. 2B (PRIOR ART)

| SYNC (12) | HEADER (4) ||| | USER DATA (2336) |
|---|---|---|---|---|---|
| | BLOCK ADDRESS(3) ||| MODE 2 (1) | |
| | MIN (1) | SEC (1) | FRAME (1) | | |

A,B,C CAN BE RECOVERECD

A,B,C CAN BE RECOVERECD

FIG. 12

▶ CONFIGURATION OF DATA
PROTECTION RECORD COMMAND ◀

BYTE 0 : COMMAND CODE
→ SELECT AND USE ONE AMONG RESERVED CODES

BYTE 1 : REPETITION INTERVAL

BYTE 2 : REPETITION TURNS

BYTE 3 : DATA PROTECTION FUNCTION ON/OFF FLAG

BYTE 4 ~ BYTE 11 : RESERVED

DATA RECORDING/REPRODUCING METHOD WITH ROBUST ERROR HANDLING CAPABILITY AND DATA RECORDING/REPRODUCING APPARATUS THEREOF

CROSS-REFERENCE TO RELATED APPLICATION

This application claims the benefit of Korean Patent Application No. 2003-48654, filed on Jul. 16, 2003 in the Korean Intellectual Property Office, the disclosure of which is incorporated herein by reference.

BACKGROUND OF THE INVENTION

1. Field of the Invention

The present invention relates to a data recording/reproducing method, and more particularly, to a data recording/reproducing method with robust error handling capability and a data recording/reproducing apparatus using the method.

2. Description of the Related Art

Data recording media may be damaged due to its structural defects, careless usage, etc. For example, an optical disc drive can fail to correctly read data recorded on an optical disc loaded therein due to structural defects or scratches on the optical disc, dust, etc. To correctly read information recorded on an optical disc, research is being conducted to determine a method for detecting defective areas before or during a recording operation, wherein the defective areas are skipped or replaced with predetermined areas. Further, a method that records data with error correction codes is also being researched. The method that skips the defective areas or replaces the defective areas with the predetermined areas before or during data recording does not correct problems resulting from disc defects, scratches, dust, etc., generated after data recording. Methods for solving such problems have been proposed in Korean Patent Publications No. 1996-7006168 (published on Nov. 8, 1996), No. 1999-76751 (published on Oct. 15, 1999), No. 2000-66892 (published on Nov. 15, 2000), No. 2002-33754 (published on May 7, 2002), No. 2000-21178 (published on Apr. 15, 2000), No. 2001-95387 (published on Nov. 7, 2001), and No. 2002-72089 (published on Sep. 14, 2002), etc., and other like systems.

In addition, the method of recording the data with the error correction codes has a limitation in error correction capability due to the length of error correction bits. The length of the error correction bits is generally limited by a minimum recording unit (block). Accordingly, if the amount of errors generated by the disc defects, scratches, dust, etc. is larger than a maximum amount of errors capable of being corrected by the error correction method applied to the corresponding disc, it is impossible to completely correct the generated errors, so that data recorded on the disc cannot be correctly read. Such an error correction method was disclosed in the above-mentioned Korean Patent Publication No. 1996-7006168 (published on Nov. 8, 1996).

The above-described problems prevent backup data recorded on a CD-R/W, a DVD-RAM, etc., from being correctly read, thereby reducing the system reliability. These problems are more serious in write-once discs such as compact disc-recordable ("CD-R") and a digital versatile disc-recordable ("DVD-R"). Since the write-once media has low error correction capability compared with different recording media, certain defects may not allow a drive to even access the disc.

Also, such defects may be fatal for certain data types to be recorded on the recording medium. For example, since program sources, database sources, etc., cannot generate similar data by interpolation as can be done in audio/visual ("A/V") data, these sources should be protected by a robust method.

SUMMARY OF THE INVENTION

An aspect of the invention provides a data recording method with robust error handling capability. An aspect of the invention also provides a data reproducing method with robust error handling capability. An aspect of the invention also provides an optical disc recording apparatus using the data recording method. An aspect of the invention also provides an optical disc reproducing apparatus using the data reproducing method.

According to an aspect of the invention, there is provided a data recording method including: dividing data to be recorded on a recording medium into blocks having a predetermined size; repeatedly recording each block at a predetermined number of times on the recording medium; and recording the predetermined block size and the predetermined repetition turns on the recording medium.

According to another aspect of the invention, there is provided a data reproducing method which reproduces data from a recording medium, wherein the data is recorded on the recording medium using a data recording method which divides the data into blocks having a predetermined size, repeatedly records the blocks a predetermined number of times referred to as repetition turns on the recording medium, and records the predetermined block size and the predetermined repetition turns on the recording medium, the data reproducing method comprising: reading the blocks from the recording medium; extracting desired blocks from the read blocks without replication with reference to the predetermined block size and the predetermined repetition turns; determining whether an unrecoverable error is generated in the extracted blocks; and if the unrecoverable error is generated in the extracted blocks, performing error-correction using a different block corresponding to the block with the unrecoverable error.

According to still another aspect of the invention, there is provided an optical disc recording apparatus including: a CODEC, which compresses information using a compression method; a frame format coder, which forms each frame of data compressed by the CODEC; a frame reorganizer, which divides a frame output from the frame format coder into blocks, each block having a predetermined block size and repeatedly outputs the blocks a predetermined number of times; a channel modulator, which modulates data output from the frame reorganizer into a data format to be recorded on a disc; a recording unit, which controls a laser diode included in an optical pickup so that the data modulated by the channel modulator is recorded on the disc; and a system controller, which generates sector addresses of data to be recorded on the disc and various disc management information while controlling an entire system, provides information regarding the predetermined block size and the predetermined repetition turns to the frame reorganizer, and records the predetermined block size and the predetermined number of block recordings on a predetermined area of the disc after recording is complete.

According to still yet another aspect of the present invention, there is provided an optical disc reproducing apparatus comprising: a signal processor, which amplifies and reshapes an RF signal generated through an optical pickup to output a digital signal; a channel demodulator, which channel-demodulates the digital signal output from the signal processor; a frame extractor, which divides a frame output from the channel demodulator into blocks with a block size, and extracts desired blocks from the divided blocks without replication, and repeatedly outputs the extracted blocks a predetermined number of times; a frame format decoder, which decodes format for each frame of data extracted from the frame extractor; a CODEC, which performs data extension on the data output from the frame format decoder according to a compression coding method; and a system controller, which generates sector addresses for reading desired information from a host computer with reference to various management information recorded on the disc, provides the sector addresses to a servo unit, and provides a block size and number of block recordings, with which each block was copied recorded on a predetermined area of the disc to the frame extractor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A and 2B show frame formats according to CD-ROM Mode1 and Mode2, respectively;

FIG. 12 shows a configuration of a protection record command used in the data recording method according to an aspect of the invention;

DETAILED DESCRIPTION OF THE EMBODIMENTS

Figure 1:
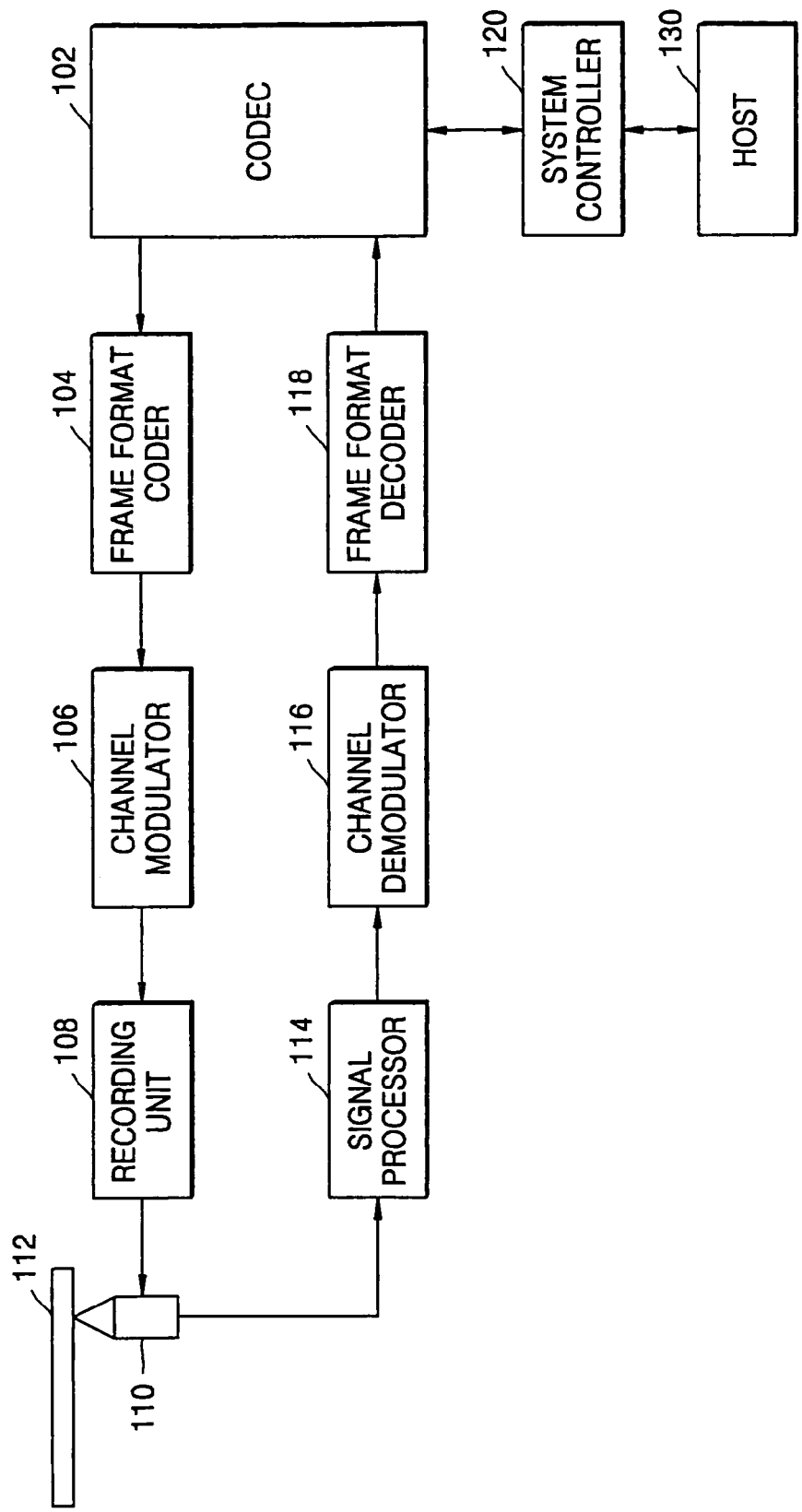
FIG. 1 is a block diagram of a conventional optical disc recording/reproducing apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a conventional optical disc recording/reproducing apparatus. In FIG. 1, components related to servo control, laser diode output control, etc., are omitted for the convenience of description. The optical disc recording/reproducing apparatus shown in FIG. 1 comprises a coder-decoder (CODEC) 102, which compresses or expands information using a compression method; a frame format coder 104, which performs scrambling, interleaving, etc., for each frame of data compressed by the CODEC 102; a channel modulator 106 which modulates a format of data output from the frame format coder 104 into a data format capable of being recorded on a disc 112; and a recording unit 108 which controls a laser diode (not shown) included in an optical pickup 110 so that data modulated by the channel modulator 106 is recorded on the disc 112. Here, a frame is a basic data group for error correction or data recording. However, the data group is not limited to a frame and may include a sequence of frames.

The optical disc recording/reproducing apparatus shown in FIG. 1 further comprises a signal processor 114 which amplifies and reshapes an RF signal generated through the optical pickup 110 to output a digital signal; a channel demodulator 116 which channel-demodulates the digital signal output from the signal processor 114; and a frame format decoder 118 which performs de-scrambling, error-correcting, de-interleaving, etc., for each frame of data demodulated by the channel demodulator 116 and outputs the resultant data to the CODEC 102.

In a recording mode, the CODEC 102 compresses and encodes data received from a host computer 130 according to a predetermined compression coding method (for example, the MPEG standard). The frame format coder 104 performs scrambling, error-correcting, interleaving, etc., for each frame of the compressed and encoded data received from the CODEC 102. The channel modulator 106 modulates data output from the frame format coder 104 using a predetermined modulation method (for example, EFM (Eight to Fourteen Modulation), EFM+modulation, etc.). The recording unit 108 drives the laser diode included in the optical pickup 110 so that data output from the channel modulator 106 can be adaptively recorded on the optical disc 112 to suit a particular type of the optical disc 112. For example, the recording unit 108 performs NRZI (Non Return to Zero Inverted) modulation on the data output from the channel modulator 106, and generates a laser diode driving signal corresponding to the NRZI modulated data, to suite the particular type of the optical disc. The laser diode driving signals include a peak control signal, and a bias control signal, an overwrite control signal, etc., as is well known in the art.

A system controller 120 is generally implemented by a microprocessor. The system controller 120 generates addresses of sectors on which data will be recorded, various disc management information, etc., and controls the disc management information to be recorded on a predetermined section of the disc 112 after data recording is complete, while controlling the entire system. The system controller 120 receives a record command and data from the host computer 130, wherein the record command is defined in an ATAPI (AT Attachment Program Interface) standard.

A servo unit (not shown) controls the location of the optical pickup 110 according to a sector address provided by the system controller 120 and generates a clock signal for operating the system.

In a reproducing mode, the optical pickup 110 obtains an RF signal corresponding to a mark and space formed on the optical disc 112, from a laser signal generated by the laser diode (not shown) and reflected by the optical disc 112. The RF signal may be a SUM signal having a variable amplitude with respect to marks and spaces formed on the disc. The signal processor 114 amplifies and reshapes the RF signal generated by the optical pickup 110 to output a digital signal. The channel demodulator 116 performs an inverse operation of the channel modulation operation performed by the channel modulator 106 and channel-demodulates the digital signal output from the signal processor 114. The frame format decoder 118 performs an inverse operation of the operation performed by the frame format coder 104 (that is, de-scrambling, error-correcting, and de-interleaving, etc.) on a signal decoded by the channel demodulator 116, and outputs the resultant signal to the CODEC 102. The CODEC 102 demodulates original data according to a predetermined compression coding method (for example, the MPEG standard) and outputs the demodulated data to the host computer 130.

The system controller 120 generates a sector address for reading desired information from the host computer 130 with reference to various management information recorded on the optical disc 112, and provides the sector address to the servo unit (not shown). The system controller 120 receives a reproduction command from the host computer 130 wherein the reproduction command is defined in the ATAPI standard.

The servo unit (not shown) controls a focusing operation, a tracking operation, a radial movement operation, etc. of the optical pickup 110 according to various servo control signals provided by the signal processor 114 and sector addresses provided by the system controller 120, and also controls a rotation speed of the optical disc 112.

FIGS. 2A and 2B show frame formats according to CD-ROM Mode1 and Mode2, respectively. Here, a frame is a basic data group for error correction or data recording. The frame is recorded on a sector of the disc 112.

Referring to FIG. 2A, in a frame of CD-ROM MODE1, the first 16 bytes are allocated to a sync signal (12 bytes) and header information (4 bytes). The header information is used for identifying a frame, and indicates the type of data included in the corresponding frame, a correlation with the following frame, etc. The following 2048 bytes are allocated to user data, the following 4 bytes are allocated to a code for error detection, the following 8 bytes are a space reserved for later usage, and 172 bytes and 104 bytes of the last areas P and Q are allocated to error correction codes. Referring to FIG. 2B, in a frame of CD-ROM MODE2, all areas except for areas allocated for a sync signal and header information are allocated to user data.

Figure 3:
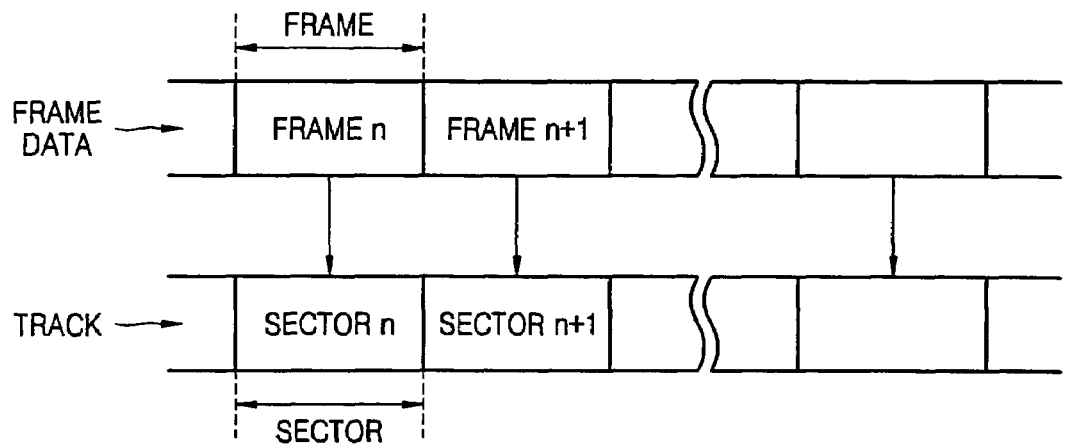
FIG. 3 illustrates a state in which frame data is recorded on a CD-ROM format.

FIG. 3 illustrates a state in which frame data is recorded with a CD-ROM format. As shown in FIG. 3, a frame is recorded on a sector with a CD-ROM format. A track with a spiral shape is formed on a disc and sectors are formed on the track. Each sector has a corresponding address and is a unit for data recording or data reproducing.

Figure 4:
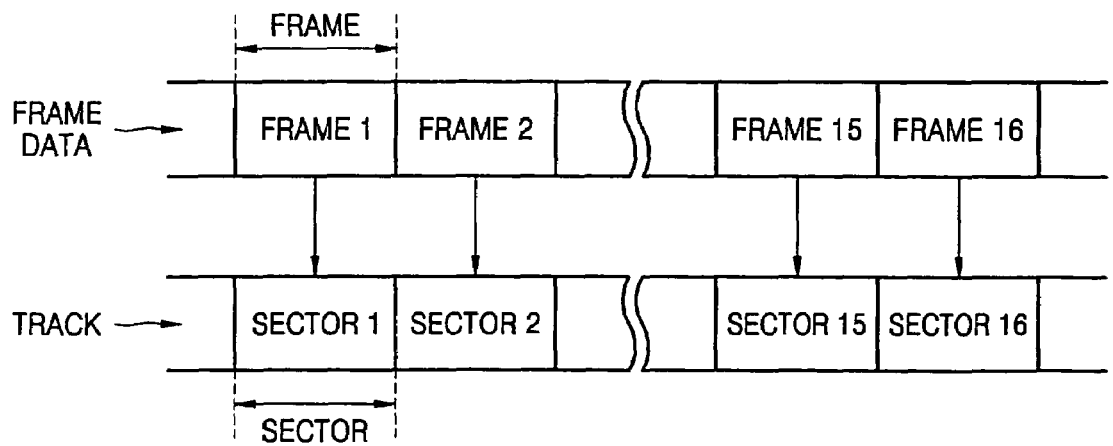
FIG. 4 illustrates a state in which frame data is recorded with a DVD-ROM format.

FIG. 4 illustrates a state in which frame data is recorded with a DVD-ROM format. As shown in FIG. 4, an error-correction block (ECC block) includes 16 2K-byte frames and is recorded on 16 successive sectors on a disc. That is, using a DVD-ROM format, one ECC block (16 sectors) is a unit for data recording or data reproducing.

Figure 5:
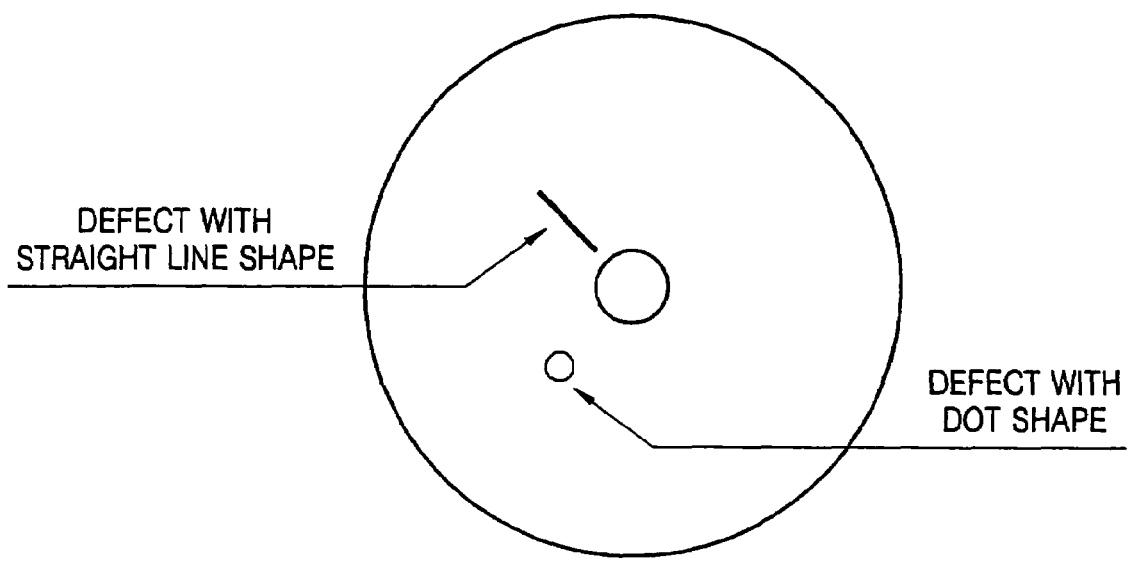
FIG. 5 is a view illustrating defects generated on an optical disc.

FIG. 5 illustrates defects generated on an optical disc. Defects generated on the optical disc include structural defects of the optical disc, defects with a straight line shape generated due to scratches, defects with a dot shape generated due to dust, etc. Defects generated due to scratches or dust are serious defects and cause problems for recording/reproducing data.

Figure 6:
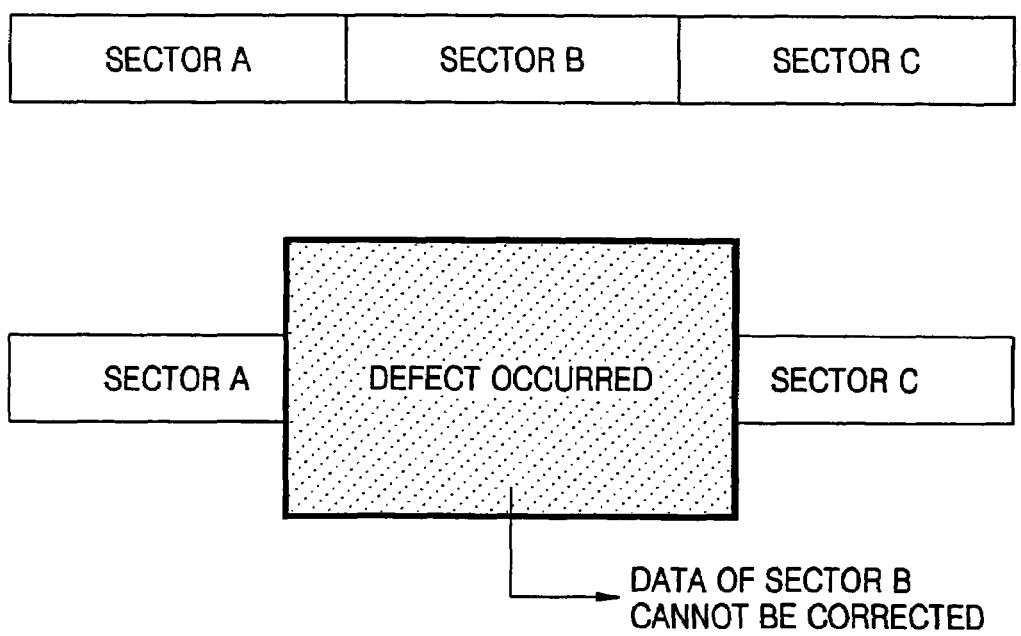
FIG. 6 is a illustrates the effects due to the defects generated on the optical disc.

FIG. 6 shows the effects caused by defects generated on an optical disc. As shown in FIG. 6, in the case where a defect is generated in sector B, data recorded on sector B gets damaged. In this case, the damaged data is first recovered by the error correction code of the corresponding frame. However, if the defect is larger than a predetermined amount capable of being recovered by the error correction code, the damaged data cannot be recovered.

If damaged data recorded on a sector with a certain defect is a program source, a database source, etc., the damaged data cannot be recovered by interpolation, which is unlike A/V data. Accordingly, the program cannot be executed and/or important field data of the database is lost. Meanwhile, if the sector with the defect is an area on which file information of the disc is recorded, it may be impossible to access the disc. This problem is very serious in disks using formats of CD-ROM, DVD-ROM, and the like for data backup and is even more serious in write-once recording media.

A data recording method according to an aspect of the invention divides data into blocks with a predetermined size and repeatedly records the same blocks on a recording medium at a predetermined number of times (hereinafter called repetition turns) so that the recorded data has a robust defect resistance. That is, by dividing the data into the same blocks with the predetermined size and repeatedly recording the blocks in a track direction utilizing a fact that defects are discontinuous in the track direction, thus it is possible to recover damaged data using redundant blocks even if a defect is generated in a certain block.

Figure 7A:
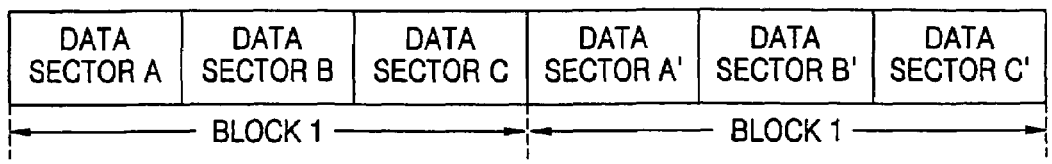
FIG. 7A illustrates a state in which data is recorded with a CD-ROM format and FIGS. 7B and 7C each illustrate a method that recovers data when a defect is generated on the disk, according to an aspect of the invention.
Figure 7B:
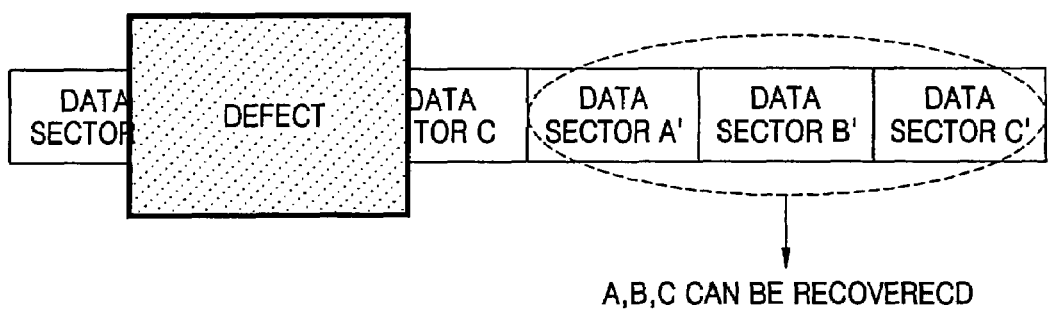
Figure 7C:
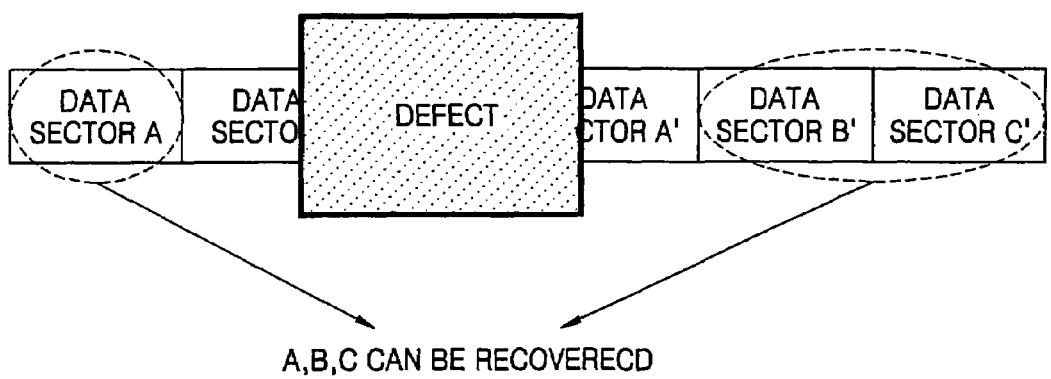

FIG. 7A illustrates a state in which data is recorded with a CD-ROM format and FIGS. 7B and 7C are views showing a method of recovering data when a defect is generated on the disk, according to an aspect of the invention.

According to the data recording method of the invention, data is divided into blocks with a predetermined size and the blocks are repeatedly recorded in a track direction on a recording medium. Referring to FIG. 7A, a sector A, a sector B, and a sector C are recorded twice in the track direction. Each sector may be recorded more or less than twice each in the track direction and/or in other directions.

Here, "sector A, sector B, and sector C" and "sector A' and sector B', and sector C'" correspond respectively to a block. The corresponding two blocks (block1, block2) have data with the same contents.

Also, FIGS. 7B and 7C show a method of recovering data when a defect is generated after recording shown in FIG. 7A. Referring to FIG. 7B, when a defect is generated in the previous blocks (sectors A, B, and C), damaged data is recovered using the following blocks (sectors A', B' and C'). If a defect is generated at boundary portions of blocks, it is possible to correctly recover data using sectors not having defects among the blocks.

Figure 8:
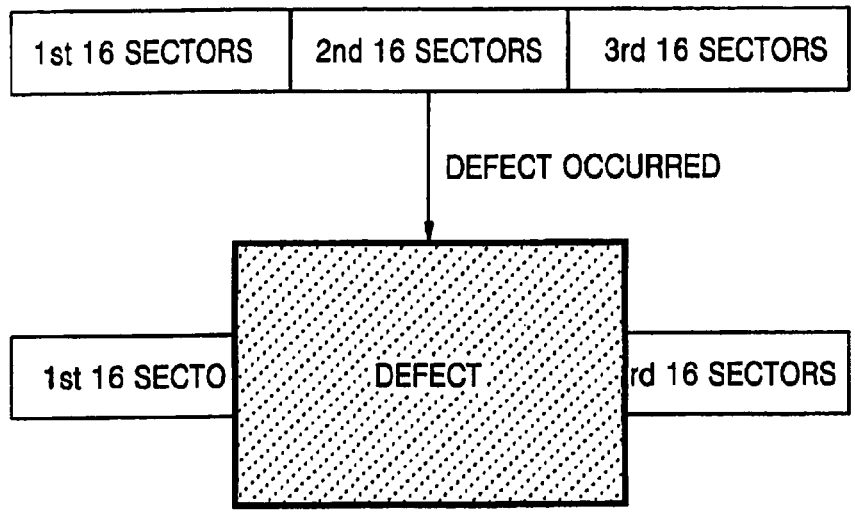
FIG. 8 illustrates a state in which a defect is generated on the disk with a DVD-ROM format.

FIG. 8 illustrates a state in which a defect is generated on the disk with a DVD-ROM format. Referring to FIG. 8, if a defect is generated in a second ECC block (16 sectors), data recorded on the second ECC block is damaged. A defect may be generated in any block on the disk, thereby damaging the data recorded on the respective block.

Figure 9:
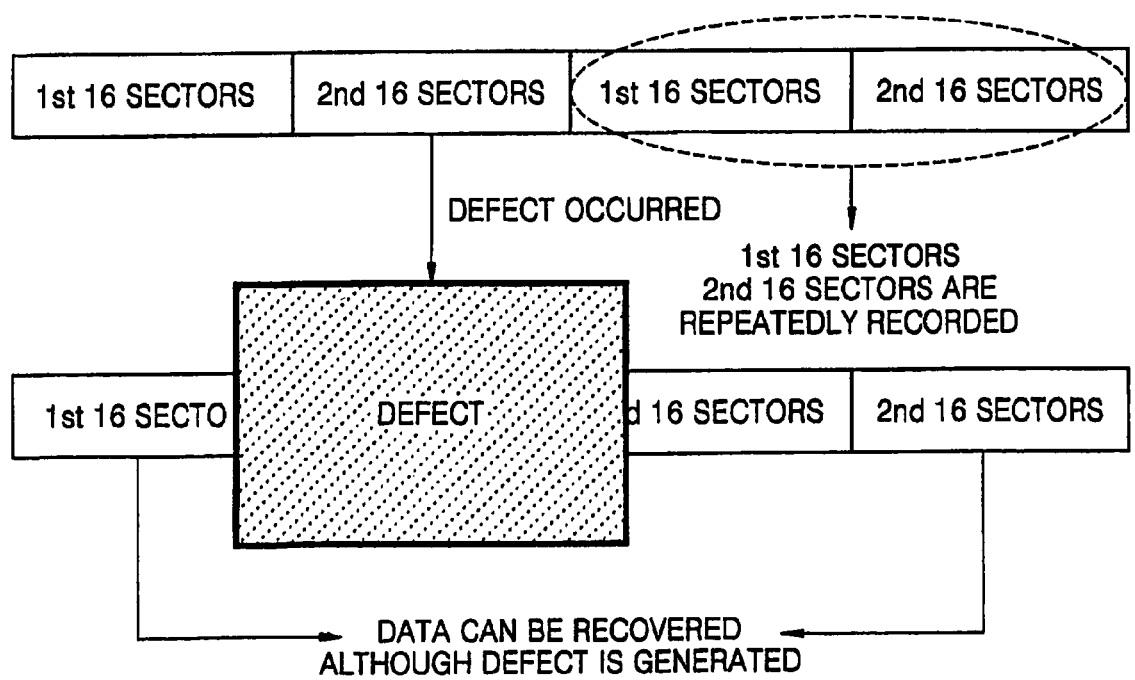
FIG. 9 illustrates a method that recovers data when a defect is generated on the disk with a DVD-ROM format, according to an aspect of the invention.
Figure 10:
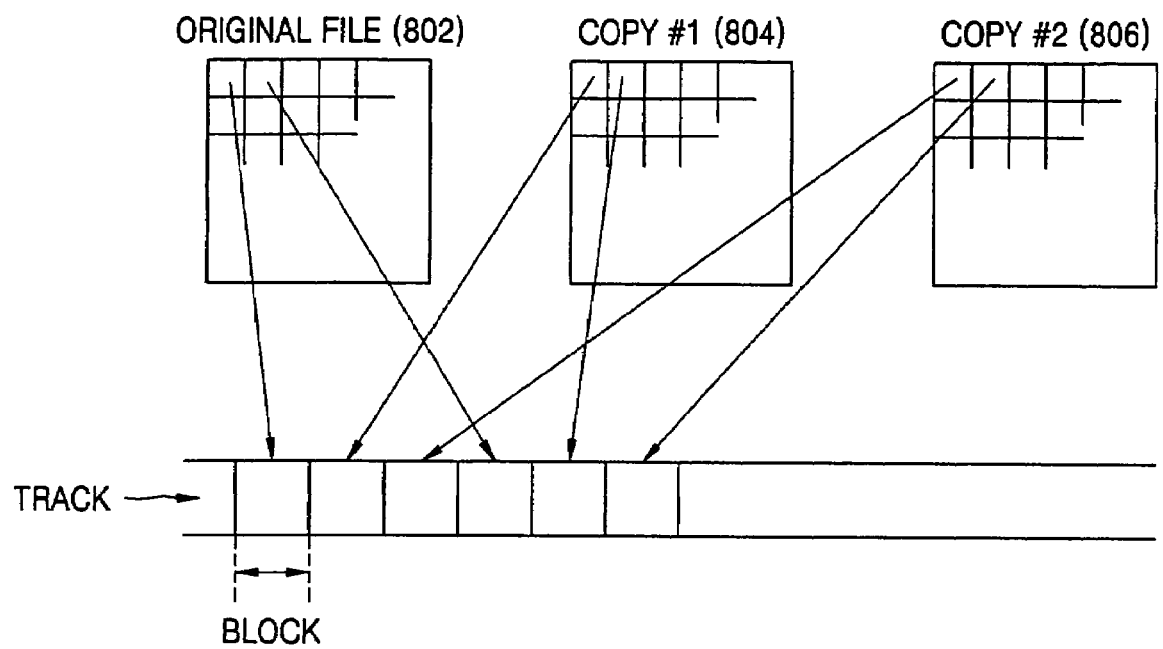
FIG. 10 illustrates a concept of a data recording method according to an aspect of the invention.

FIG. 9 a method of recovering data when a defect is generated on the disk with a DVD-ROM format, according to the invention. Referring to FIG. 9, damaged data can be recovered using blocks neighboring a block with a defect FIG. 10 illustrates a data recording method according to an aspect of the invention. As shown in FIG. 10, the data recording method according to the invention records a file 802 and at least one copy 804, 806 on the same recording medium. The data recording method according to the invention divides each file into blocks with a predetermined size and interleaves and records the divided blocks.

First, the copies 804 and 806 of an original file 802 to be recorded are created. Two copies 804 and 806 are shown in FIG. 10; however, the number of copies can be changed as required. The number of copies is referred to as repetition turns.

Each file 802, 804, 806 is divided into blocks with a predetermined size. As shown, the size of the block relates to a minimum unit in which data is recorded and/or reproduced on/from the recording medium or on which error correction is performed. The size of the block may be an integer multiple of the minimum unit. For example, in the case of a disk with a CD-ROM format which records/reproduces data for each sector, the size of a block is an integer multiple of the size of user data recorded on a sector. Meanwhile, in the case of a disk with a DVD-ROM format which records/reproduces data in units of 16 sectors, the size of a block is an integer multiple of 16 sectors.

The blocks of the respective files are recorded on the recording medium. In more detail, blocks are extracted from the original file 802 and the copies 804 and 806 in the order of the original file 802, the copy 804, the copy 806, and the extracted blocks are recorded on the recording medium in the extracted order. Through these operations, interleaving is performed. Accordingly, because three blocks with the same contents are recorded successively in the track direction on the recording medium, data of a block damaged due to defects generated on the recording medium can be replaced with data of a different block. The block size and the repetition turns should be known to a data reproducing apparatus for later reproduction. Thus, the recording medium stores the block size and repetition turns in a predetermined area for storing information related to files recorded therein, such as a storage unit. The data reproducing apparatus reads data with reference to this information according to an aspect of the invention.

Figure 11:
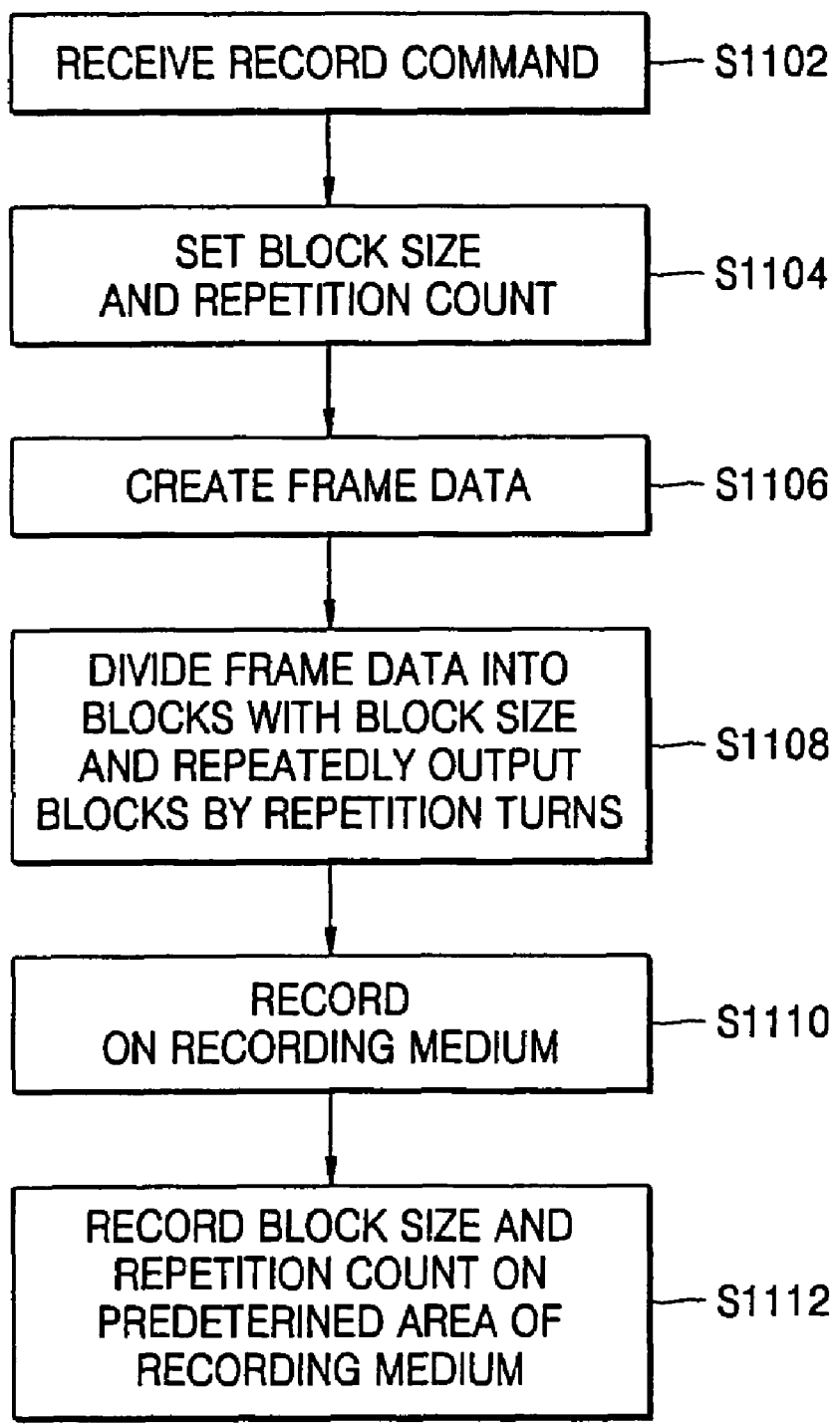
FIG. 11 is a flowchart illustrating a data recording method according to an aspect of the invention.

FIG. 11 is a flowchart illustrating a data recording method according to an aspect of the invention. Referring to FIG. 11, a record command is received from a host computer 130 in operation S1102. The record command used in the invention is referred to as a protection record command, to be distinguished from other types of record commands. Such a record command can be used with recordable discs, such as CD-R, DVD-R, and rewritable versions of CD and DVD discs.

FIG. 12 a configuration of a protection record command used in the data recording method according to an aspect of the invention. Since an optical disc recording/reproducing apparatus generally has ATAPI compatibility However, the invention is not limited to having ATAPI capability. The formats of commands are decided according to an interface standard between a recording apparatus and a host computer 130 and can be changed as required.

The ATAPI command consists of 12 bytes and the first byte (byte 0) of the 12 bytes is used for representing the type of command to be performed. To distinguish from preoccupied ATAPI commands, the protection record command uses one of Reserved CODEs according to an aspect of the invention.

The second byte (byte 1) and the third byte (byte 2) of the ATAPI command are allocated to a block size and repetition turns, respectively. The block size represents the size of data recorded by an interleave method and is preferably an integer multiple of a minimum unit in which data is recorded or reproduced on/from the recording medium or on which error correction is performed. The repetition turns relate to data recovery capability. As the repetition turns increase, the data recovery capability becomes higher. However, the amount of data capable of being stored on the recording medium becomes smaller. The fourth byte (byte 3) of the ATAPI command is used as a flag indicating setting/non-setting of the protection record command.

A block size M and repetition turns N are set as indicated by the protection record command in operation S1104. The block size M and the repetition turns N are referenced when a frame output from the frame format coder is divided or repeated. The block size M and the repetition turns N are recorded on a predetermined area of the disc so that they can be referenced for later sector addressing and error-correction. The block size M and the repetition turns N can be set as defaults. For example, if the block size M and the repetition turns N are not set or are too large even if protection recording is set, the recording operation is performed using the block size and repetition turns set as the defaults. Therefore, it is possible to maintain a recording capacity of a recording medium to be larger than a required recording capacity by controlling the repetition turns so that the recording capacity of the recording medium can be larger than the size of a file to be recorded.

Scrambling, interleaving, error-correcting, etc., on data supplied from the host computer 130 are performed to form a frame in operation S1106. Here, the size of a frame is dependent on a minimum unit of data or an error correction unit of data, capable of being recorded on the recording medium. In the case of a CD-ROM format, a frame is one sector, and in the case of a DVD-ROM format, a frame occupies 16 sectors. Each frame is divided into blocks having the block size M and the blocks are repeatedly output N times where N is the repetition turns in operation 1108.

Then, the data output in operation 1108 is channel-modulated and recorded on the recording medium in operation S1110. Information indicating at least whether protection recording is performed, the block size M, and the repetition turns N are recorded on a related information storage area of the recorded file in the recording medium. This related information storage area may be a TDB (Track Descriptor Block) of a CD-R and may be a Physical Format Information Data Block of a Control Data Zone (CDZ) of a DVD +R/−R. The information storage area is not limited to either the TBD of a CD-R or the Physical Format Information Data Block of DVD +R/−R.

When a reproducing apparatus reproduces the data, the reproducing apparatus refers to the block size M and the repetition turns N recorded in the related information storage area.

Figure 13:
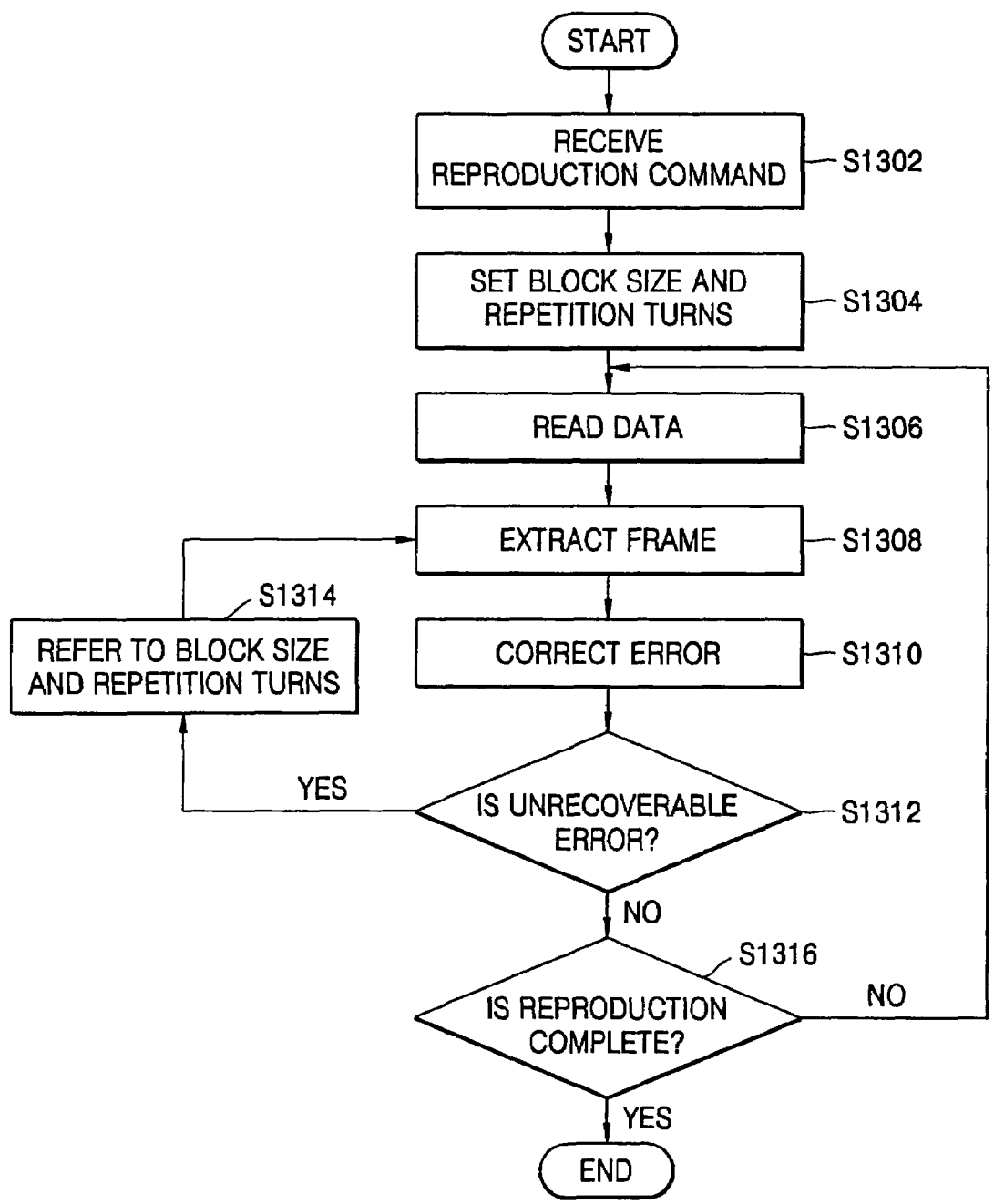
FIG. 13 is a flowchart illustrating a data reproducing method according to an aspect of the invention.

FIG. 13 is a flowchart of a data reproducing method according to an aspect of the invention. Referring to FIG. 13, a data reproduction command is received from a host computer 130 in operation S1302. A reproducing apparatus accesses a related information storage area storing information related to files recorded on the recording medium, and obtains information indicating whether a corresponding file is recorded by a protection record command, a block size M, and repetition turns N in operation S1304. The block size M and the repetition turns N are used for extracting required frames from frames read from the recording medium or performing error-correction on the read frames.

Data of a corresponding file is read from the recording medium in operation S1306. Frames are extracted from the corresponding file with reference to the block size M and the repetition turns N in operation S1308. For example, if the block size M is 3 sectors and the repetition turns are 2, 3 sectors are extracted per 6 sectors. Error-correction is performed on the extracted frame in operation S1310. After the error-correction is performed, it is determined in operation S1312 whether the frame data has been correctly read.

If it is determined that an unrecoverable error not capable of being recovered by an error correction code in the extracted frame is generated, a different block corresponding to the frame with the error is accessed with reference to the block count M and repetition turns N, and the error correction operation S1310 is performed again on the block. The error-correction is performed by replacing a damaged sector with a corresponding sector of a different block or by correcting the damaged sector using an error correction code of a corresponding sector of a different block.

After the error-correction is performed, if it is determined that the block is correctly read, then it is determined in operation S1316 whether the file is completely reproduced. If the file is not completely reproduced, the process returns to operation S1306 and the following block is read.

The reproduction method shown in FIG. 13 extracts required blocks after reading all blocks recorded on the disc. However, it is noted that only required blocks can be read without reading all blocks recorded on the disc 112. In this case, the system controller 120 and the servo unit obtain sector addresses for reading required blocks with reference to the block size M and the repetition turns N. Also, a block corresponding to a block with an error can be searched for by the same method.

According to the recording/reproducing methods shown in FIGS. 11 and 13, the recording operation is performed by the recording apparatus and the reproducing operation is performed by the reproducing apparatus. However, it is understood that, the recording and reproducing methods according to the present invention can be performed by the host computer 130. For example, when a host computer 130 creates a data file to be recorded on the recording medium, the host computer 130 can create the data file using the block size and repetition turns set according to aspects of the present invention and allows the recording apparatus to record the data file on the recording medium. Also, when the reproducing apparatus reproduces the file recorded on the recording medium and transfers the reproduced file to the host computer 130, the host computer 130 performs error-correction and data recovery for each block in the file.

However, in this case, an error correction code, etc., should be added to the data file generated by the host computer 130 and error-correction should be performed for each block on the data file. Also, since the size of the block is different for different recording media, the host computer 130 should identify the type of the recording medium and an error correction method suitable for the particular block size should be used. Also, since information indicating whether protection recording is performed, the block size, and the repetition turns cannot be recorded on the recording medium, comparability is low. For these reasons, the recording/reproducing method is performed more accurately by the recording/reproducing apparatus rather than the host computer 130. It is further understood that the methods can be performed without a host computer as occurs in stand alone players.

Figure 14:
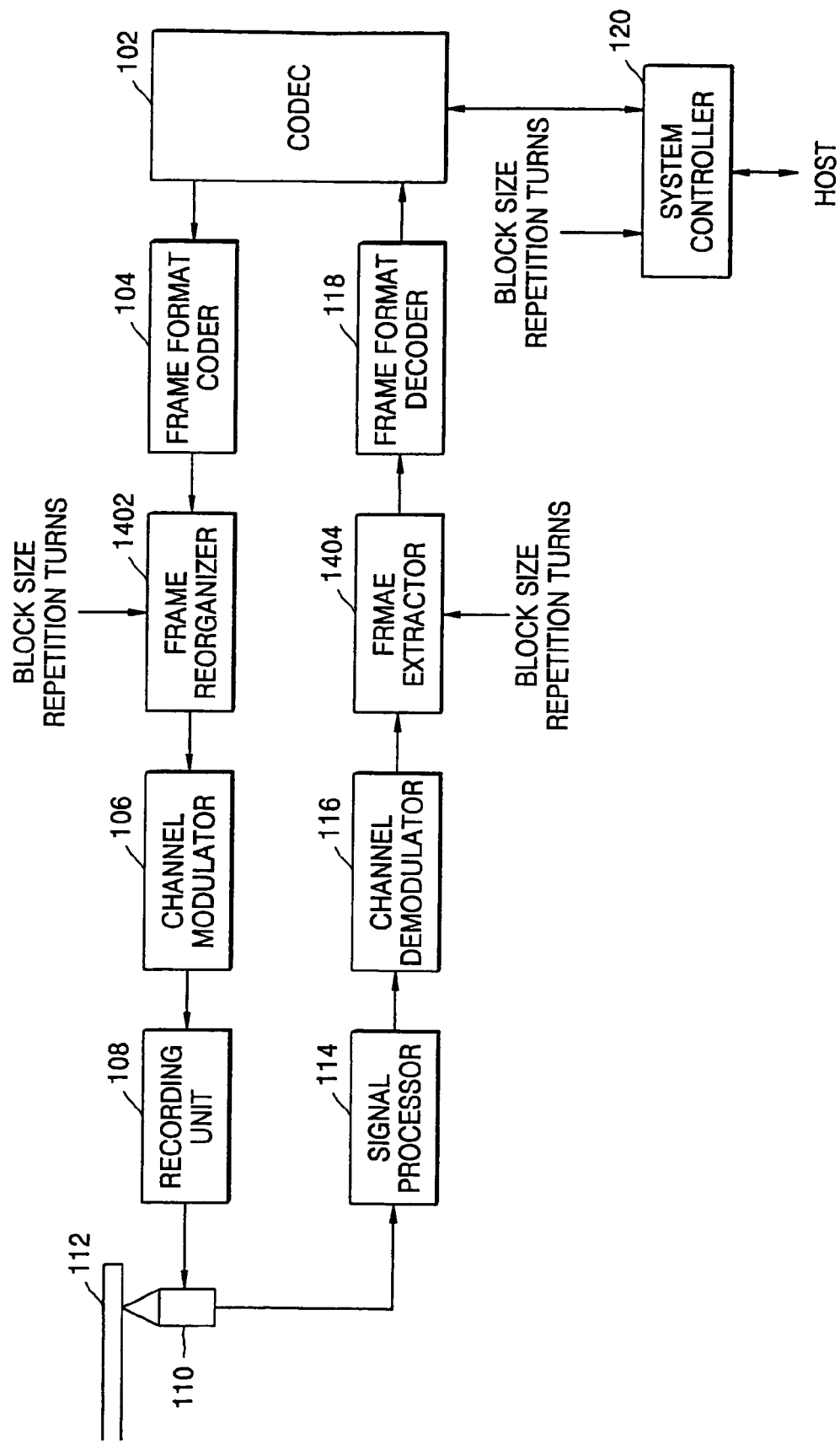
FIG. 14 is a block diagram of an optical disc recording/reproducing apparatus according to an aspect of the invention.

FIG. 14 is a block diagram of an optical disc recording/reproducing apparatus according to an aspect of the invention. In FIG. 14, components having the same reference numbers as those of FIG. 1 operate in the same manner as the respective components of FIG. 1 and therefore detailed descriptions thereof are omitted. The optical disc recording/reproducing apparatus shown in FIG. 14 includes a frame reorganizer 1402 which reorganizes frames output from the frame format coder according to the protection record command when data recording, and a frame extractor 1404 which extracts required blocks from the file recorded by the protection record command, unlike the optical disc recording/reproducing apparatus shown in FIG. 1 according to an aspect of the invention. The frame reorganizer 1402 divides a frame output from the frame format coder 104 into blocks having the block size M and repeatedly outputs the divided blocks N times where N is the number of repetition turns.

Figure 15:
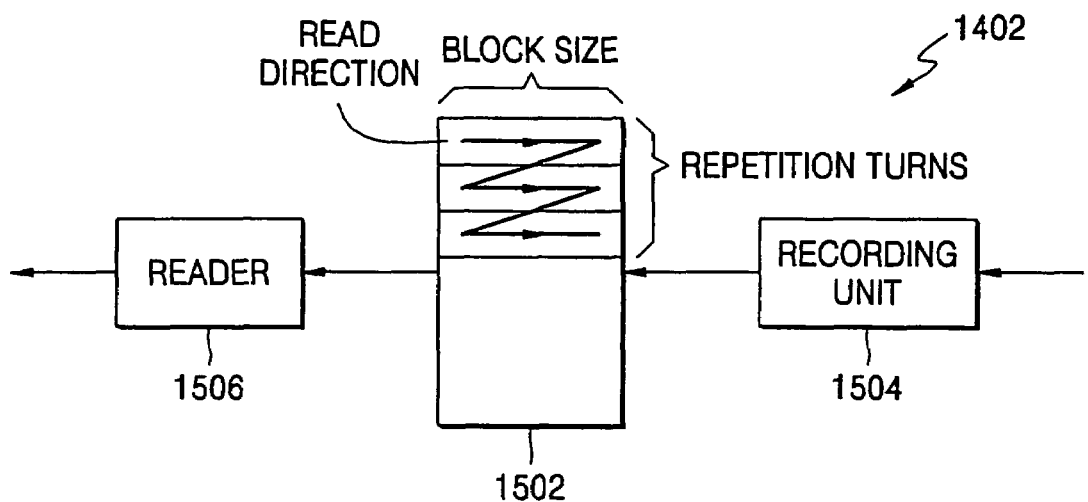
FIG. 15 shows a configuration of a frame reorganizer 1402 shown in FIG. 14.

FIG. 15 shows a configuration of the frame reorganizer 1402 shown in FIG. 14. The frame reorganizer 1402 performs a buffer function and includes a memory 1502 in which frame data is recorded or from which frame data is read, a recording unit 1504 which records frame data in the memory 1502, and a reader 1506 which reads frame data recorded in the memory 1502.

The recording unit 1504 divides the frame data into blocks having the block size M and repeatedly records the divided frame data in the memory 1502 N times wherein N is the repetition turns. The reader 1506 sequentially reads the frame data recorded in the memory 1502 in a predetermined direction (denoted by a solid line) shown in FIG. 15 and provides the read frame data to the channel modulator 106. Accordingly, it is preferable that the memory 1502 has a storage capacity corresponding to frame size×maximum block size $M_{max}$×maximum repetition turns $N_{max}$.

Figure 16:
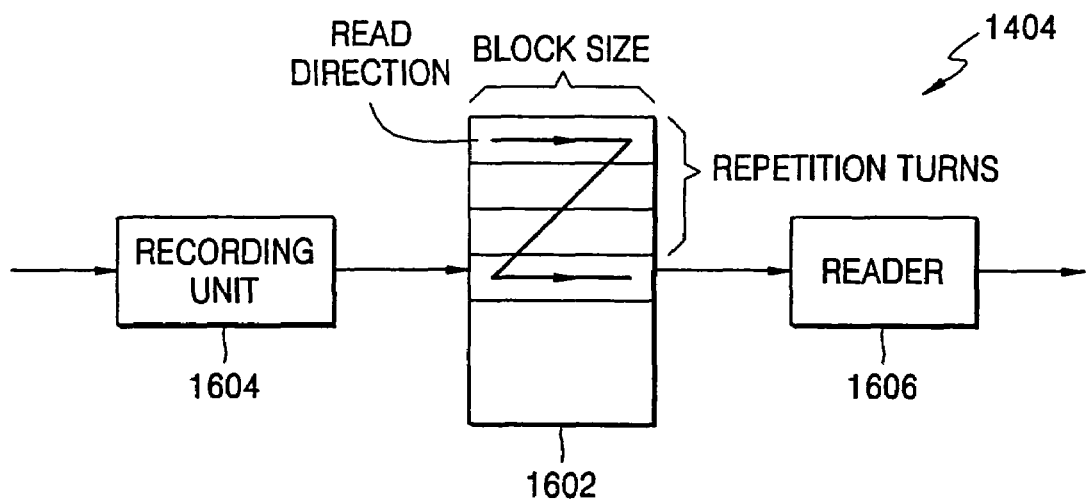
FIG. 16 shows a configuration of a frame extractor 1404 shown in FIG. 14.

FIG. 16 shows a configuration of the frame extractor 1404 shown in FIG. 14. The frame extractor 1404 divides a frame output from the channel modulator 116 into blocks having the block size M, extracts desired blocks from the divided blocks without replication, and repeatedly outputs the extracted blocks N times where N is the repetition turns.

The frame extractor 1404 performs a buffer function and includes a memory 1602 in which frame data is recorded or from which frame data is read, a recording unit 1604 which records frame data in the memory 1602, and a reader 1606 which reads only desired frames among frame data recorded in the memory 1602 with reference to the block size M and the repetition turns N.

The recording unit 1604 divides data provided from the channel demodulator 116 into blocks having the block size M and records the divided blocks on the memory 1602. The reader 1606 reads frame data recorded in the memory 1602 in a predetermined direction (denoted by a solid line in FIG. 16) in a manner to read each frame data corresponding to the block size N times wherein N is the repetition turns, and provides the read frame data to the frame format decoder 118.

Accordingly, the memory 1602 should have a storage capacity corresponding to frame size×maximum block size $M_{max}$×maximum repetition turns $N_{max}$. However, it is understood that the storage capacity of the memory 1602 may be set as required.

The operation of the optical disc recording/reproducing apparatus shown in FIG. 14 is described in detail here below. In a recording mode, the CODEC 102 compression-encodes and outputs data received from the host computer 130 according to a predetermined compression coding method (for example, the MPEG standard). The frame format coder 104 performs scrambling, interleaving, error-correcting, etc., for each frame on compression-encoded data received from the CODEC 102. The frame reorganizer 1402 divides a frame output from the frame format coder 104 into blocks having the block size M and repeatedly outputs the divided blocks N times, where N is the repetition turns. The channel modulator 106 modulates and outputs data output from the frame reorganizer 1402 by a predetermined modulation scheme (for example, EFM, EFM+modulation, etc.). The recording unit 108 drives a laser diode included in the optical pickup 110 so that data output from the channel modulator 106 is recorded adaptively with respect to the recording type of the optical disc 112.

The system controller 120 generates sector addresses of data to be recorded and various disc management information, and controls the recording so that the disc management information is recorded on the disc 112 after recording is terminated, while controlling the entire system. If a protection record command is received, the block size M and the repetition turns N are provided to the frame reorganizer 1402. Also, after recording is terminated, information indicating whether recording is performed by the protection record command, the block size, and the repetition turns are recorded on a designated area on the disc, in order to be used for later reproduction.

The servo unit (not shown) controls the location of the optical pickup 110 according to the sector addresses provided by the system controller 120 and generates a clock signal for operating the system.

In the reproduction mode, the optical pickup 110 obtains and outputs an RF signal corresponding to the mark and space formed on the optical disc 112 from a laser signal generated by the laser diode (not shown) and reflected by the optical disc 112. The RF signal may be a general sum signal whose amplitude is changed according to the mark and space formed on the disc.

The signal processor 114 amplifies and reshapes the RF signal generated through the optical pickup 110 to output a digital signal. The channel demodulator 116 performs an inverse operation of the channel modulation operation performed by the channel modulator 106 and channel-demodulates and outputs the digital signal output from the signal processor 114. The frame extractor 1404 divides a frame output from the channel demodulator 116 into blocks having the block size M, extracts desired blocks from the divided blocks, and repeatedly outputs the extracted blocks for each of the repetition turns N.

The frame format decoder 118 performs an inverse operation to the operation performed by the frame format coder 104 (that is, descrambling, error-correcting, and deinterleaving, etc.) on frame data output from the frame extractor 1404, and outputs the frame data to the CODEC 102. The CODEC 102 demodulates original data using a predetermined compression coding method (for example, MPEG standard) and outputs the demodulated data to the host computer 130.

The system controller 120 generates sector addresses for reading desired information from the host computer 130 with reference to various management information recorded on the optical disc 112, and outputs the sector addresses to the servo unit (not shown).

In the reproduction mode, the system controller 120 checks whether a file is a file recorded by the protection record command with reference to information recorded on a predetermined area of the disc, and provides the block size M and the repetition turns N to the frame extractor 1404 if the file is determined to be the file recorded by the protection record command.

The servo unit (not shown) controls a focusing operation, a tracking operation, etc., of the optical pickup 110 in response to various servo control signals provided by the signal processor 114 and the sector addresses provided by the system controller 120, and also controls a rotation speed of the optical disc 112. While described in terms of disks using formats of CD-ROM and DVD-ROM, it is understood that other types of discs, such as rewritable DVD and CDs, and other read only, write-once, and rewritable discs can use the method of the present invention.

The invention can be implemented by a method, an apparatus, and a system. If an aspect of the invention is implemented by software, components of the present invention are code segments that execute necessary tasks. Programs or code segments can be stored in a processor readable medium or media and can be transmitted by a computer data signal coupled with a carrier wave through a transmission medium or via a network. The invention may also be a program stored on a computer readable medium that can be run on a general computer. Here, the computer readable medium includes, but is not limited to, storage media such as magnetic storage media (e.g., ROM's, floppy discs, hard discs, etc.), optically readable media (e.g., CD-s, DVDs, etc.), and carrier waves (e.g., transmission over the Internet). The present invention may also be embodied as a computer readable program code unit stored on a computer readable medium, that causes a number of computer systems connected via a network to affect distributed processing.

As described above, according to the data recording method of the invention, damaged data may be recovered using a predetermined different block instead of a defective block by dividing data into blocks with a predetermined size and repeatedly recording the blocks on a recording medium by a predetermined count, so that the recorded data has a robust defect resistance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A data recording method comprising:
   dividing data to be recorded on a recording medium into a plurality of blocks, with each block having a predetermined block size;
   repeatedly recording each of the blocks a predetermined number of times on the recording medium, and
   recording the predetermined block size and the predetermined number of block recordings on the recording medium.

2. The data recording method of claim 1, wherein the predetermined block size is dependent on a minimum recording unit and an error correction unit of the recording medium.

3. The data recording method of claim 2, wherein the predetermined block size is an integer multiple of the minimum recording unit of the recording medium or an integer multiple of the error correction unit of the recording medium.

4. The data recording method of claim 1, wherein the data recording method is executed in response to a protection record command.

5. The data recording method of claim 4, wherein the protection record command includes at least a block size and a number of block recordings.

6. The data recording method of claim 5, wherein the number of block recordings changes according to a size of a data file and a remaining recording capacity of the recording medium.

7. The data recording method of claim 4, wherein the protection record command is an AT Attachment Program Interface command.

8. The data recording method of claim 7, wherein the protection record command includes information indicating a protection recording command, information on a block size, and information on a number of repetition turns with which each block is to be recorded.

9. The data recording method of claim 8, wherein the protection record command further includes information indicating and distinguishing between a setting and a non-setting of a protection recording.

10. The data recording method of claim 1, wherein the recording medium is an optical disc.

11. The data recording method of claim 10, wherein the optical disc is a write once optical disc.

12. The data recording method of claim 11, wherein the optical disc is a CD-R.

13. The data recording method of claim 11, wherein the optical disc is a DVD +R/−R.

14. A data recording method comprising:
creating at least one copy of an original file to be recorded on a recording medium;
dividing the original file and the at least one copy into a plurality of blocks, each block having a predetermined size, respectively;
alternately reading predetermined ones of blocks from the respective blocks of the original file and the copy;
recording the read blocks on the recording medium; and
recording the predetermined block size and the number of copies on the recording medium.

15. The data recording method of claim 14, wherein the data recording method is performed by using a recording apparatus to record data on the recording medium.

16. The data recording method of claim 15, wherein the recording apparatus is an optical disc recording apparatus.

17. The data recording method of claim 16, wherein the recording apparatus records data on a write once disc.

18. A data reproducing method that reproduces data from a recording medium, wherein the data is recorded on the recording medium using a data recording method that divides the data into blocks, each block having a predetermined size, repeatedly records each of the blocks a predetermined number of times on the recording medium, and records the predetermined block size and the predetermined number of copies on the recording medium, the data reproducing method comprising:
reading the blocks from the recording medium;
extracting desired blocks from the read blocks without replication with reference to the predetermined block size and the predetermined number of copies;
determining whether an unrecoverable error is generated in the extracted blocks; and
if the unrecoverable error is generated in the extracted blocks, performing error-correction using a different block corresponding to the block with the unrecoverable error.

19. The data reproducing method of claim 18, wherein the error-correction is performed by replacing the block with the unrecoverable error with a corresponding different block.

20. The data reproducing method of claim 18, wherein the error-correction is performed using an error correction code of the different block corresponding to the block with the unrecoverable error.

21. The data reproducing method of claim 18, wherein the recording medium is an optical disc.

22. The data reproducing method of claim 21, wherein the optical disc is a write once optical disc.

23. The data reproducing method of claim 21, wherein the optical disc is a CD-R.

24. The data reproducing method of claim 21, wherein the optical disc is a DVD +R/−R.

25. A method of recording/reproducing data from a data file having at least one data frame, the method comprising:
dividing the data frame into a plurality of blocks, each block having a predetermined size;
copying each data block a predetermined number of times;
sequentially recording each of the data blocks and the copied data blocks on the recording medium such that the copied data blocks allow for recorded data to be reproduced after a defect occurs on the recording medium; and
recording the predetermined block size and the predetermined number of times, respectively, in a storage location.

26. The recording/reproducing method of claim 25, wherein the storage location is on the recording medium.

27. The recording/reproducing method of claim 26, wherein the storage location is an area of the recording medium to be referenced for a sector address and an error correction.

28. The recording/reproducing method of claim 26, wherein the predetermined size of the data blocks relates to a minimum unit in which data is recorded/reproduced.

29. The recording/reproducing method of claim 28, wherein the size of each data block is an integer multiple of the minimum recording/reproducing unit or an integer multiple of an error correction unit of the recording medium.

30. The recording/reproducing method of claim 26, wherein the recording medium is an optical disc.

31. The recording/reproducing method of claim 30, wherein the optical disc is a CD-ROM and the size of each data block is an integer multiple of the size of user data recorded on a sector of the CD-ROM.

32. The recording/reproducing method of claim 30, wherein the optical disc is a DVD-ROM that records/reproduces data in units of 16 sectors, the size of each data block is an integer multiple of 16 sectors.

33. The recording/reproducing method of claim 25, wherein the recording is performed according to a recording command.

34. The recording/reproducing method of claim 33, wherein the recording command is in an AT Attachment Packet Interface (ATAPI) format.

35. The recording/reproducing method of claim 33, wherein the recording command includes a size of each data block and a number of copies of each data block.

36. The recording/reproducing method of claim 26, further comprising determining the size of each data block and the number of copies of each data block and setting the determined values as a default such that if the size of each data block and the number of copies of each data block are not set in a recording command or are set too large for the medium, the recording is performed using the default.

37. The recording/reproducing method of claim 26, wherein the storage location is a track descriptor block if the storage medium is a CD-R and a physical format information data block of a control data zone if the storage medium is a DVD +R/−R.

38. The recording/reproducing method of claim 26, further comprising extracting data from the recording medium according to the size of each data block and the number of copies of each data block such that only required data blocks are extracted from the recording medium.

39. The recording/reproducing method of claim 38, further comprising performing an error correction on each of the data blocks with the extracted data having an error, wherein the error correction is performed by replacing a damaged sector with a corresponding sector of a copied data block related to the damaged block or by correcting the damaged sector using an error correction code of the corresponding sector of the copied data block related to the damaged block.

40. The recording/reproducing method of claim 39, further comprising reproducing the data such that only required data blocks are read and extracted from the recording medium.

41. The recording/reproducing method of claim 26, wherein recording/reproducing is performed using a computer, and the computer provides error correction and data recovery for each data block having an error.

42. The recording/reproducing method of claim 26, wherein the storage location has a storage capacity corresponding to a size of the data frame, a maximum data block size, and a maximum number of times each data block is copied.

43. A method of recording/reproducing data from a data file having at least one data frame divided into data blocks, the method comprising:
    copying each data block a predetermined number of times;
    recording each data block in sequential order with the respective copied data blocks;
    extracting data from the recording medium according to a size of each data block and the number of copies of each data block; and
    performing an error correction on each of the data blocks with the extracted data having an error, the error correction being performed by replacing a damaged sector with a corresponding sector of a copied data block related to the damaged block or by correcting the damaged sector using an error correction code of the corresponding sector of the copied data block related to the damaged block, wherein
    the copied data blocks allow for recorded data to be reproduced after a defect occurs on the recording medium.

44. The recording/reproducing method of claim 43, further comprising storing a size of each data block and the number of copies in a storage location.

45. The recording/reproducing method of claim 43, wherein the error-correction is performed by replacing the data block having an unrecoverable error with a related copied data block.

46. The recording/reproducing method of claim 43, wherein the error-correction is performed using an error correction code of a copied data block corresponding to the data block having an unrecoverable error.

47. An optical disc recording and/or reproducing apparatus comprising:
    a coder/decoder to compress information using a compression method;
    a frame format coder to format each frame of data compressed by the coder/decoder;
    a frame reorganizer to divide a frame output from the frame format coder into a plurality of blocks, each block having a predetermined block size and to repeatedly output each of the blocks a predetermined number of times to produce at least one copy of each block;
    a channel modulator to modulate data output from the frame reorganizer into a data format to be recorded on a disc;
    a recording unit to control a laser diode included in an optical pickup so that the data modulated by the channel modulator is recorded on the disc; and
    a system controller to generate sector addresses of data to be recorded on the disc and disc management information while controlling an entire recording system, to provide information regarding the predetermined block size and the predetermined number of block recordings to the frame reorganizer, and to record the predetermined block size and the predetermined number of block recordings on a predetermined area of the disc after recording is complete.

48. The optical disc recording and/or reproducing apparatus of claim 47, wherein:
    the frame reorganizer comprises:
        a memory on or from which the frame data output from the frame format coder is recorded or read,
        a recording unit to record the frame data on the memory, and
        a reading unit to read the frame data recorded in the memory, and
    the recording unit divides the frame data into blocks with the predetermined block size and repeatedly records the divided blocks in the memory, and the reading unit sequentially reads the frame data recorded in the memory and provides the read frame data to the channel modulator.

49. The optical disc recording and/or reproducing apparatus of claim 47, wherein the optical disc recording apparatus records data on a write once disc.

50. An optical disc recording and/or reproducing apparatus comprising:
    a signal processor to amplify and reshape an RF signal generated through an optical pickup to output a digital signal;
    a channel demodulator to channel-demodulate the digital signal output from the signal processor;
    a frame extractor to divide a frame output from the channel demodulator into blocks with a block size, extract desired blocks from the divided blocks without replication, and repeatedly output the extracted blocks a predetermined number of times;
    a frame format decoder to decode a format for each frame of data extracted from the frame extractor;
    a coder-decoder to perform data extension on the data output from the frame format decoder according to a compression coding method; and
    a system controller to generate sector addresses for reading desired information from a host computer with reference to management information recorded on the disc, provide the sector addresses to a servo unit, and provides the block size and the number of block recordings, with which each block was copied on the disc, recorded on a predetermined area of the disc to the frame extractor.

51. The optical disc recording and/or reproducing apparatus of claim 50, wherein the optical disc reproducing apparatus reproduces data from a write once disc.

52. An optical disc recording and/or reproducing apparatus with an optical pickup to record/reproduce data such that recorded data is reproduced after a defect occurs on a recording medium, the apparatus comprising: a recording unit to record data onto the recording medium, the recording unit to divide a data frame into at least one data block having a predetermined size and output each data block a predetermined number of times to form at least one copy of each data block, and to modulate a format of the divided blocks so that the data is recorded on the recording medium; and a reproducing unit to reproduce data recorded on the recording medium, the reproducing unit to demodulate the data from signal generated by the optical pickup, and to divide the demodulated signal into data blocks, each block having the predetermined size, and to output the extracted data blocks the predetermined number of times.

53. The optical disc recording and/or reproducing apparatus of claim 52, further comprising a signal processor to amplify and reshape an RF signal generated through the optical pickup to output a digital signal.

54. The optical disc recording and/or reproducing apparatus of claim 53, further comprising:
- a frame format decoder to decode a format for each frame of data extracted from the reproducing unit; and
- a coder-decoder to perform data extension on the data output from the frame format decoder according to a compression coding method.

55. The optical disc recording and/or reproducing apparatus of claim 54, further comprising a system controller to generate sector addresses for reading desired information from a source with reference to various management information recorded on the disc, provide the sector addresses to a servo unit, and provide the block data size and the number of copies of each data block recorded on a predetermined area of the disc to the reproducing unit.

56. The optical disc recording and/or reproducing apparatus of claim 55, wherein the coder-decoder compresses data using a compression method, the format of each frame of data compressed by the coder-decoder is formatted by a frame format coder.

57. The optical disc recording and/or reproducing apparatus of claim 54, wherein the recording unit further includes a memory location on or from which data output from the frame format coder is recorded or read.

58. The optical disc recording and/or reproducing apparatus of claim 52, wherein the reproducing unit further includes a memory from which frame data is read, a recorder to record frame data in the memory, and a reader to read only desired frame data in the memory according to the data block size and the number of copies of each data block, the reader reads each data block in a predetermined direction.

59. The optical disc recording and/or reproducing apparatus of claim 58, wherein the storage capacity of the memory corresponds to a size of the data frame, a maximum data block size, and a maximum number of times each data block is copied.

60. The optical disc recording and/or reproducing apparatus of claim 52, wherein the coder-decoder uses an MPEG standard compression coding method.

61. The optical disc recording and/or reproducing apparatus of claim 52, wherein the recording unit modulates and outputs data from the frame reorganizer according to an EFM modulation scheme.

62. A computer readable medium comprising computer readable code to control at least one processing element in a computer to implement a method of recording/reproducing data from a data file having at least one data frame, the method comprising:
- dividing the data frame into a plurality of blocks, each block having a predetermined size;
- copying each data block of the data frame a predetermined number of times;
- sequentially recording each of the data blocks and the copied data blocks on the recording medium such that the copied data blocks allow for recorded data to be reproduced after a defect occurs on the recording medium; and
- recording the predetermined block size and the predetermined number of times, respectively, on the recording medium.

63. The medium of claim 62, further comprising dividing the data file into the data blocks, each data block having a predetermined size relating to a minimum unit in which data is recorded/reproduced, wherein a length of error correction bits is larger than a length of each of the data blocks.

64. The medium of claim 63, wherein the size of each data block is an integer multiple of the minimum recording/reproducing unit or an integer multiple of an error correction unit of the recording medium.

65. The medium of claim 64, wherein the computer readable medium is at least one of a CD-R and a DVD +R/–R.

66. The medium of claim 64, wherein the computer readable medium is a magnetic storage medium.

67. The medium of claim 64, wherein the computer readable medium is an optically readable medium.

* * * * *

UNITED STATES PATENT AND TRADEMARK OFFICE
CERTIFICATE OF CORRECTION

PATENT NO. : 7,406,010 B2 Page 1 of 1
APPLICATION NO. : 10/892482
DATED : July 29, 2008
INVENTOR(S) : Sang-hoon Hyen It is certified that error appears in the above-identified patent and that said Letters Patent is hereby corrected as shown below:

Column 13, Line 44, before "recording" insert --optical disc--.

Column 14, Line 43, after "is" change "a CD-ROM" to --written with a CD-ROM format--.

Column 14, Line 45, after "sector" delete "of the CD-ROM".

Column 14, Line 47, change "a DVD-ROM" to --written with a DVD-ROM format--.

Column 15, Line 1, change "storage" to --recording--.

Column 15, Line 2, change "storage" to --recording--.

Column 15, Line 34, change "blocks;" to --blocks on a recording medium;--.

Column 17, Line 37, after "by" change "a frame" to --the frame--.

Column 17, Line 41, after "memory" delete "location".

Signed and Sealed this

Eighteenth Day of November, 2008

JON W. DUDAS
*Director of the United States Patent and Trademark Office*